US 11,738,665 B2

(12) United States Patent
Klimpel

(10) Patent No.: US 11,738,665 B2
(45) Date of Patent: Aug. 29, 2023

(54) COOLING CIRCUIT OPERABLE WITH FUEL OF A FUEL CELL SYSTEM AND VEHICLE WITH A COOLING CIRCUIT

(71) Applicant: Airbus Operations GmbH, Hamburg (DE)

(72) Inventor: Frank Klimpel, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 285 days.

(21) Appl. No.: 17/171,444

(22) Filed: Feb. 9, 2021

(65) Prior Publication Data

US 2021/0245629 A1 Aug. 12, 2021

(30) Foreign Application Priority Data

Feb. 11, 2020 (EP) .................................... 20156614

(51) Int. Cl.
*B60L 58/33* (2019.01)
*B60L 50/70* (2019.01)
(Continued)

(52) U.S. Cl.
CPC ............... *B60L 58/33* (2019.02); *B60L 50/70* (2019.02); *H01M 8/04014* (2013.01);
(Continued)

(58) Field of Classification Search
CPC .... B60L 58/33; B60L 50/70; B60L 2240/545; H01M 8/04014; H01M 8/0432; H01M 8/04768; H01M 2250/20
See application file for complete search history.

(56) References Cited

U.S. PATENT DOCUMENTS 4,820,594 A * 4/1989 Sugita ................ H01M 8/0612
429/429
6,653,004 B1 * 11/2003 Barber .............. H01M 8/04089
429/456
(Continued)

FOREIGN PATENT DOCUMENTS

DE 102017217348 A1 * 3/2019
DE 102018209480 A1 * 12/2019
(Continued)

OTHER PUBLICATIONS

English machine translation of Lotfey et al. (DE 102018209480 A1) (Year: 2019).*
English machine translation of Kunberger et al. (DE 102017217348 A1) (Year: 2019).*
(Continued)

*Primary Examiner* — Brian R Ohara
*Assistant Examiner* — Aaron J Salter
(74) *Attorney, Agent, or Firm* — Greer, Burns & Crain, Ltd.

(57) ABSTRACT

A cooling circuit operable with fuel of a fuel cell system includes a fuel tank storing fuel for the fuel cell system, a fuel compressor configured to increase a pressure of the fuel, a first heat exchanger configured to cool the pressurized fuel, a first conduit coupled to an outlet of the first heat exchanger, a first turbine coupled to the first conduit and configured to expand the pressurized and cooled fuel, and a second conduit coupled to an outlet of the first turbine and configured to direct the expanded fuel to the fuel cell system. Further disclosed is a vehicle including at least one cooling circuit or a cooling system having a cooling circuit.

16 Claims, 5 Drawing Sheets

(51) Int. Cl.
 *H01M 8/04014* (2016.01)
 *H01M 8/0432* (2016.01)
 *H01M 8/04746* (2016.01)

(52) U.S. Cl.
 CPC ..... *H01M 8/0432* (2013.01); *H01M 8/04768* (2013.01); *B60L 2240/545* (2013.01); *H01M 2250/20* (2013.01)

(56) References Cited

U.S. PATENT DOCUMENTS

| | | | | |
|---|---|---|---|---|
| 2003/0207164 | A1* | 11/2003 | McElroy | H01M 8/186 244/30 |
| 2007/0089382 | A1* | 4/2007 | Miura | F04B 39/16 55/385.1 |
| 2009/0297903 | A1 | 12/2009 | Hirayama et al. | |
| 2011/0236781 | A1* | 9/2011 | Hood | H01M 8/04828 429/437 |
| 2013/0078541 | A1* | 3/2013 | Gummalla | H01M 8/04097 429/444 |
| 2019/0312288 | A1 | 10/2019 | Tsubouchi | |

FOREIGN PATENT DOCUMENTS

| | | | |
|---|---|---|---|
| JP | H02197712 A | | 8/1990 |
| JP | 08203547 A | * | 8/1996 |
| JP | 2002205537 A | * | 7/2002 |

OTHER PUBLICATIONS

English machine translation of Kimata et al. (JP 2002205537 A) (Year: 2002).*
English machine translation of Hashizaki et al. (JP 08203547 A) (Year: 1996).*
European Search Report; priority document.

* cited by examiner

COOLING CIRCUIT OPERABLE WITH FUEL OF A FUEL CELL SYSTEM AND VEHICLE WITH A COOLING CIRCUIT

CROSS-REFERENCES TO RELATED APPLICATIONS

This application claims the benefit of the European patent application No. 20156614.8 filed on Feb. 11, 2020, the entire disclosures of which are incorporated herein by way of reference.

FIELD OF THE INVENTION

The invention relates to a cooling circuit operable with fuel of a fuel cell system, and a vehicle comprising such cooling circuit. In particular, the invention relates to a cooling circuit, wherein fuel for the fuel cell system is pressurized, cooled and expanded before being directed to the fuel cell system. The invention further relates to a vehicle having such cooling circuit and using ram air to cool the fuel.

BACKGROUND OF THE INVENTION

Fuel cells become more and more important energy sources in vehicles, since the fuel cells and fuel can be lighter than corresponding battery systems, and since refilling the fuel can be faster than charging batteries. The fuel, such as hydrogen, can be stored under pressure and/or at a low temperature, so that the fuel can additionally be used with a turbine, in order to produce mechanical energy, and as a heat sink for cooling purposes. Since the available cooling capacity of the fuel before being provided to the fuel cell is limited due to the current amount of fuel consumed in the fuel cell, additional cooling capacity is required and usually provided by other means. For instance, ambient air is used as a heat sink for cooling purposes, for example in the form of ram air or a skin heat exchanger in a moving vehicle.

However, the use of ram air and surface structures of a skin heat exchanger create drag at an outer skin of the vehicle, which leads to higher fuel consumption.

SUMMARY OF THE INVENTION

It is therefore an object of the present invention to provide a cooling circuit and vehicle with an improved cooling efficiency.

According to an aspect to better understand the present invention, a cooling circuit operable with fuel of a fuel cell system comprises a fuel tank storing fuel for the fuel cell system, a fuel compressor configured to increase a pressure of the fuel, and a first heat exchanger configured to cool the pressurized fuel. The fuel of/for a fuel cell system, such as hydrogen, is usually stored at high pressure and/or low temperature. For instance, hydrogen can be stored in the tank at 50 to 150 bar or even up to 700 bar. It is also possible to store hydrogen in the tank between 2 and 10 bar, preferably at approximately 3 bar, having a temperature between −260° C. to −150° C., preferably approximately −250° C.+/−5° C.

When the fuel is compressed in the fuel compressor, its temperature increases, so that the temperature difference between the compressed fuel and a cooling medium employed with the first heat exchanger as a heat sink increases. In other words, due to the hotter compressed fuel, the fuel can be cooled, while maintaining an increased pressure compared to the pressure in the fuel tank. This is particularly useful if the cooling medium employed with the first heat exchanger has a relatively high temperature. For instance, the cooling medium can be ambient air in an environment surrounding the cooling circuit, which may significantly vary in temperature depending on the location, the time of day, the incident of sunlight, a height (above sea level), etc. Thus, the fuel compressor can be used to adjust the temperature difference between the fuel and the ambient air employed as a heat sink in the first heat exchanger. As an example only, in case the cooling medium employed with the first heat exchanger is rather cold (e.g., approximately 0° C. or less), the fuel compressor may only slightly increase the pressure of the fuel, and hence its temperature, or may not compress the fuel at all. On the other hand, if the cooling medium is rather hot (e.g., approximately 50° C., 60° C. or more), the fuel compressor may increase the pressure of the fuel, and hence its temperature, for example up to 200° C. or even more.

The cooling circuit may further comprise a first conduit coupled to an outlet of the first heat exchanger, a first turbine coupled to the first conduit and configured to expand the pressurized and cooled fuel, and a second conduit coupled to an outlet of the first turbine and configured to direct the expanded fuel to the fuel cell system. Expanding the fuel in the first turbine allows recovery of energy from the compressed fuel in the form of mechanical energy and, at the same time, adjusting the pressure of the fuel to be optimized for the operation of the fuel cell system. For instance, the fuel cell system may be operated at a pressure of approximately 1 bar to 5 bar, preferably of approximately 2 bar. The fuel can be introduced into an anode section of the fuel cell system, where it is used to produce electrical energy.

Furthermore, the mechanical energy recovered from the fuel in the first turbine can be used to operate or at least facilitate driving the fuel compressor. For instance, the first turbine and the fuel compressor may be mechanically coupled, e.g., via a common shaft. In order to operate the fuel compressor independent of the first turbine, a clutch may be integrated.

According to an optional variant, the first turbine and fuel compressor may be mechanically coupled to a common shaft that also drives a vehicle, in which the cooling circuit is employed. For instance, the first turbine and fuel compressor may be mechanically connected to a drivetrain or the like of the vehicle. According to a specific example where the vehicle is an aircraft, the common shaft of the first turbine and fuel compressor may also be a shaft of a propeller driving the aircraft.

In an implementation variant, the cooling circuit may further comprise a control unit configured to control a cooling capacity of the first heat exchanger, and further configured to control the fuel compressor in such a manner that the first heat exchanger can be operated with a minimal cooling capacity. The cooling capacity of the first heat exchanger is the amount of heat that can be transferred from the fuel in the first heat exchanger to a cooling medium employed with the first heat exchanger as a heat sink per unit time. For instance, the cooling capacity of the first heat exchanger can be the amount of heat that can be transferred from the fuel to ambient air flowing over the first heat exchanger. The control unit may control the cooling capacity of the first heat exchanger by adjusting an amount of cooling medium provided to the first heat exchanger per unit time.

Likewise, the control unit may control the fuel compressor by adjusting an output pressure, a driving speed, etc., of the fuel compressor.

In order to operate the first heat exchanger with a minimal cooling capacity, the control unit can be configured to reduce the amount (volume and/or mass flow) of cooling medium provided to the first heat exchanger as much as possible. When reducing the amount of cooling medium, the output pressure of the fuel compressor needs to be increased, which also leads to a higher temperature of the compressed fuel, so that the temperature difference between cooling medium and compressed fuel increases. Thus, a cooling of the compressed fluid is still possible, while the amount of cooling medium can be reduced. If ambient air is used as the cooling medium, the consumption of ambient air is also reduced, which leads to less drag and in case of a vehicle to less fuel consumption to move the vehicle. The increased pressure of the fuel still allows efficient cooling when expanding the pressurized fuel in the turbine. Therefore, the overall efficiency and cooling efficiency is increased.

In accordance with a further implementation variant, the cooling circuit further comprises a first ram air channel, and at least one control device configured to adjust a volume flow of air through the first ram air channel. The first heat exchanger can be arranged in the first ram air channel. The at least one control device can be a flap at an inlet and/or an outlet of the first ram air channel and/or a corresponding actuator, which is capable of adjusting a cross-section of the inlet and/or outlet of the first ram air channel. By opening or closing such flap(s) the control unit can reduce the amount of ram air flowing through the first ram air channel, in order to keep the cooling capacity of the first heat exchanger in the first ram air channel to a minimum. Thus, the control unit can be configured to operate the fuel compressor and adjust the at least one control device in such a manner that the volume flow of (ambient) air through the first ram air channel is kept to a minimum.

In another implementation variant, a temperature sensor is arranged in the first ram air channel, in order to sense a temperature of the ram air in the first ram air channel. The control unit may be coupled to the sensor, in order to detect the temperature of the ram air, which is employed as a heat sink with the first heat exchanger. For instance, the temperature sensor can be arranged upstream of the first heat exchanger, in order to sense a temperature of the inflowing ambient air. Thus, the control unit can operate the fuel compressor and adjust the at least one control device of the first ram air channel in such a manner that a high temperature difference between compressed fuel and ram air is achieved, while a minimum of ram air (volume and/or mass flow) is required. The control unit can be configured to operate the fuel compressor and to adjust the at least one control device in such a manner that the temperature difference between compressed fuel and ram air is constant depending on the temperature of the ram air. As an example only, the fuel compressor may be operated, so that the compressed fuel at an outlet of the fuel compressor has a temperature of approximately 200° C., when the ram air temperature is at approximately 20° C. The control unit may operate the fuel compressor, so that the temperature difference is always approximately 180K. Of course, the control unit may operate the fuel compressor to achieve any temperature difference.

Additionally or alternatively, the control unit may operate the fuel compressor and adjust the at least one control device in such a manner that the energy consume of the fuel compressor is below a threshold value. The threshold value may be determined on the basis of a required cooling capacity of the cooling circuit. For instance, if a high cooling capacity is required due to high thermal loads, the energy consumed by the fuel compressor may be increased, while the at least one control device is not adjusted. Thus, the drag induced by the ram air channel can be kept to a minimum. If the cooling capacity further increases, a balance between energy consumption of the fuel compressor and energy losses due to drag of the ram air channel can be determined by the control unit and the fuel compressor and at least one control device are controlled accordingly. The required cooling capacity of the cooling circuit may be determined by the control unit based on temperature sensor signals associated with the thermal loads, and/or energy consumption of heat producing devices (e.g., electric or electronic devices), etc.

In accordance with an implementation variant, the cooling circuit may further comprise a second heat exchanger arranged in the second conduit and configured to transfer heat from a cooling medium to the fuel in the second conduit. Since the second conduit is coupled to the outlet of the first turbine, the cooling medium can be cooled by the expended and, hence, cooled fuel in the second conduit. Due to the cooling of the compressed fuel in the first heat exchanger and the subsequent expansion of the fuel in the turbine, an efficient cooling of the fuel and, hence, efficient cooling of the cooling medium can be achieved. The cooling medium may flow through a closed cooling circuit. Instead of a closed cooling circuit, the second heat exchanger may be used to cool any cooling medium, i.e., any fluid that passes through/over the second heat exchanger and is hence thermally coupled with the cooled fuel. For instance, a blower or other conveying device may be employed with the second heat exchanger, so that cool air or another conveyed fluid can be achieved with the second heat exchanger.

In an optional implementation variant, the control unit can further be configured to control the fuel compressor in dependence of a required cooling capacity at the second heat exchanger. For instance, if a higher cooling capacity is required at the second heat exchanger (more heat is to be transferred from the cooling medium to the fuel), the control unit may increase the output pressure of the fuel compressor. After cooling the compressed fuel and expanding the fuel in the turbine, a lower temperature of the fuel can be achieved compared to the operation of the cooling circuit before the control unit increases the output pressure.

In a further implementation variant, the cooling circuit can further comprise a third conduit connecting the fuel tank with the fuel compressor, and a third heat exchanger arranged in the third conduit and configured to transfer heat from a cooling medium to the fuel in the third conduit. Particularly, if the fuel in the fuel tank is stored at a low temperature (e.g., below 0° C.), the fuel can be warmed in the third heat exchanger, while the cooling medium can be cooled. Thus, a thermal energy recovery can be achieved before the mechanical energy recovery in the first turbine. The cooling medium can be the same, which is cooled at the second heat exchanger, or can be a different cooling medium for a different cooling purpose.

In another implementation variant, the fuel compressor includes a first compression stage, wherein an inlet of the first compression stage is coupled to the third conduit, and wherein an outlet of the first compression stage is coupled to a fourth conduit configured to direct compressed fuel to the first heat exchanger. Thus, the first compression stage may function as the fuel compressor.

In an optional variant, the cooling circuit may further comprise a recirculation fuel conduit drawing unconsumed fuel from an outlet of the fuel cell system. Usually, a fuel cell system is operated with an amount of fuel exceeding the amount of fuel converted into electrical energy. The exceeding fuel amount can be recirculated and mixed with fresh fuel. For instance, the fuel compressor may further include a second compression stage, wherein an inlet of the second compression stage is coupled to the recirculation fuel conduit, while an outlet of the second compression stage is coupled to the fourth conduit configured to direct compressed fuel to the first heat exchanger. Here, the compressed fuel exiting the first compression stage and the second compression stage may be mixed before being directed to the first heat exchanger.

An optional component may be a pressure valve at the outlet of the second compression stage, in order to adjust the pressure of the fuel at the outlet of the second compression stage to correspond to the pressure at the outlet of the first compression stage. Thus, the compressed fuel from the second compression stage can easily be fed into the fourth conduit, in which the pressure is primarily influenced from the outlet pressure of the first compression stage.

A further optional component may be a reservoir tank provided in the recirculation fuel conduit. The reservoir tank is configured to collect unconsumed fuel at the outlet of the fuel cell system (particularly the anode section of the fuel cell system). This reservoir tank can be used to buffer unconsumed fuel, if the second compression stage draws less fuel than output at the outlet of the fuel cell system.

In a further optional variant, the reservoir tank may further be equipped with or coupled to a release valve configured to release unconsumed fuel into the environment, such as ambient air. This release valve may be used, if the fuel is primarily employed for cooling a cooling medium and the amount of unconsumed fuel increases, which cannot be buffered, and hence, will even not be consumed in the fuel cell system after recirculation. For instance, if a peak cooling power of the cooling circuit is required, the cooling circuit may be operated with an increased amount of fuel, although this amount of fuel cannot be consumed by the fuel cell system.

In another implementation variant the cooling circuit further comprises a motor coupled to the fuel compressor and configured to control a pressure of the fuel at an outlet of the fuel compressor. The motor can be an electric motor, pneumatic motor, hydraulic motor or the like. The motor may be coupled to the fuel compressor directly via a shaft or indirectly via a gear transmission, a clutch and/or another component to adjust a rotational speed of the motor and the fuel compressor. The motor may also be coupled with a shaft connecting the first turbine and the fuel compressor, in order to assist operating the fuel compressor, particularly if the first turbine does not provide enough power for operating the fuel compressor. In case the cooling circuit is employed in a vehicle, the motor may be a drive engine that drives the vehicle. In other words, the motor may be mechanically connected to the drive train of the vehicle. According to a specific example, the motor drives a propeller of an aircraft.

According to an optional variant, the motor may be an electric motor that receives electrical energy from the fuel cell system. In this way, a source of electrical energy can be combined with an efficient cooling of the source of electrical energy (the fuel cell system) and of the motor (if necessary). The mechanical energy consumed by the fuel compressor is at least partially recovered by the mechanical energy provided by the first turbine. Thus, the energy required for driving the vehicle is only partially reduced, or in case of a high cooling of the compressed fuel is even increased, due to the mechanical coupling of the fuel compressor and first turbine.

In a further implementation variant, the motor may be coupled to the first or second compression stage, while the other one of the first and second compression stage is driven by the first turbine. For instance, in order to control the pressure, and hence temperature, of the fuel in the fourth conduit, provided to the first heat exchanger, the motor can drive the first compression stage. The motor can also drive other components, such as a drivetrain of the vehicle, while the first compression stage is mechanically coupled to the motor via a gear transmission, a clutch, or the like. The first turbine can then be used to drive the second compression stage drawing unconsumed fuel from the fuel cell system.

In yet another implementation variant, the cooling circuit may further comprise components to provide an oxidant to the fuel cell system. Usually, air is used as an oxidant, as it contains oxygen. The oxidant is provided in a cathode section of the fuel cell system, to react with the fuel in the anode section of the fuel cell system, for example, via a membrane arranged between the anode section and cathode section.

Thus, the cooling circuit may further comprise an air compressor configured to compress air, and a compressed air conduit coupled to an outlet of the air compressor and configured to direct the compressed air to the fuel cell system. The air compressor may achieve an outlet pressure of approximately 1 bar to 5 bar, preferably of approximately 2 bar, which is the operating pressure of fuel cell system, i.e., the pressure of the fuel as well as the oxidant. It is to be understood that the fuel cell system may be operated with any gas containing oxygen, such as air as well as oxygen enriched air or the like, although reference is solely made to an "air" compressor, "air" conduit, etc.

In accordance with a further variant, the cooling circuit can further comprise a fourth heat exchanger arranged in the compressed air conduit and configured to cool the compressed air. The compressed/pressurized air allows sufficient supply of oxidant to the fuel cell system, while cooling the compressed air in the fourth heat exchanger allows optimizing the temperature of the oxidant for the operation of the fuel cell system.

In accordance with another implementation variant, the cooling circuit can further comprise an exhaust air conduit coupled to an outlet of the fuel cell system, a fifth heat exchanger arranged in the exhaust air conduit and configured to cool the exhaust air, and a water separator arranged in the exhaust air conduit downstream of the fifth heat exchanger and configured to remove water from the cooled exhaust air. During the conversion of fuel and oxidant into electrical energy, water is produced in the fuel cell system, which can be exhausted via the exhaust air conduit. Cooling the exhaust air in the fifth heat exchanger allows condensation of the water and removal of the water from the exhaust air.

In a further implementation variant, the cooling circuit can further comprise a fresh air conduit coupled to an inlet of the air compressor, wherein a first branch of the fresh air conduit collects warmed fresh air, and wherein a second branch of the fresh air conduit collects cool fresh air. The first and second branch of the fresh air conduit may each be fluidly coupled to ambient air, so that the air compressor can suck air through the fresh air conduit via one or both of the first and second branch. The first and second branch of the fresh air conduit have open ends at different positions, one of which is located in an area containing fresh air with a temperature higher than fresh air in another area, at which the open end of the other one of the first and second branches is positioned. The first and second branches are coupled to one another, so that they merge together to the remainder of the fresh air conduit.

An opening of the first branch of the fresh air conduit can be positioned close to the fifth heat exchanger, so that ambient air warmed/heated by the fifth heat exchanger (heat transfer from the exhaust air conduit into the ambient air surrounding the fifth heat exchanger) can be sucked into the fresh air conduit and the air compressor. Likewise, an opening of the second branch of the fresh air conduit can be positioned away from the fifth heat exchanger or away from any other source of heat, so that rather cool ambient air can be sucked into the fresh air conduit and the compressor.

As an example only, the fifth heat exchanger and each opening of the first and second branch of the fresh air conduit are positioned in the first ram air channel or a second ram air channel. Ambient air flows through the (first/second) ram air channel and flows over the fifth heat exchanger, thereby cooling the exhaust air in the exhaust air conduit. The opening of the first branch of the fresh air conduit is then best positioned downstream of the fifth heat exchanger in a flow direction of the ambient air through the ram air channel, while the opening of the second branch of the fresh air conduit is positioned upstream of the fifth heat exchanger in the flow direction of the ambient air through the ram air channel.

An optional component can be a temperature control valve in the first and/or second branch of the fresh air conduit. Alternatively, the temperature control valve is a multi-way valve, which is connected to each of the first and second branch of the fresh air conduit at respective inlets of the valve and is connected to the air compressor with a combined outlet of the valve. By controlling a cross-section of the temperature control valve, and hence a volume/mass flow of ambient air flowing through the first/second branch, the temperature of the fresh air in the fresh air conduit downstream of a connecting point of the first and second branch can be adjusted. Specifically, the temperature of the fresh air in the fresh air conduit can be adjusted by mixing warmed air from the first branch with cold air of the second branch of the fresh air conduit.

Additionally or alternatively, the water from the water separator can be sprayed into the fresh air conduit upstream of the inlet of the air compressor. This allows moisturizing the fresh air before being fed into the fuel cell system. Usually, the fuel cell system operates under humid conditions, so that water can be recycled, in order to have an optimum humidity in the fuel cell system.

Also additionally or alternatively, the temperature control valve may control the temperature in the fresh air conduit to be above 0° C. Thus, in case water is sprayed into the fresh air conduit upstream of the inlet of the air compressor, the water does not freeze and hence does not block the fresh air conduit and/or inlet of the air compressor.

In yet another implementation variant, the cooling circuit may further comprise a second turbine coupled to the exhaust air conduit and configured to expand exhaust air in the exhaust air conduit downstream of the fifth heat exchanger. If ambient air is used as a source of oxidant, the exhaust air can be wasted instead of being recycled. Thus, the pressure of the exhaust air can be used to recover mechanical energy via the second turbine. For instance, the second turbine can be mechanically coupled to the air compressor to drive the air compressor. Such coupling may take place via a common shaft of the second turbine and the air compressor. This allows energy recovery, so that the cooling circuit can be operated more efficiently.

Additionally or alternatively, an outlet of the second turbine can be fluidly coupled with ambient air outside of the cooling circuit. Thus, a pressure difference between the pressure of the exhaust air and the ambient air can be used to drive the turbine and, hence, the air compressor.

In a further implementation variant, the cooling circuit can further comprise a motor coupled to the air compressor, in order to drive the air compressor. The motor can be mechanically coupled with the air compressor in addition or alternatively to the turbine. In order to control an output pressure of the air compressor, the motor can be coupled to the air compressor via a gear transmission, a clutch, or any other intermediate component.

Additionally or alternatively, the cooling circuit can comprise an auxiliary drive of the motor coupled to the fuel compressor, wherein the auxiliary drive is configured to drive the air compressor. Thus, a single motor can be used to drive the fuel compressor as well as the air compressor. Optionally, a gearbox can be provided that is mechanically coupled to the auxiliary drive and the air compressor, in order to adjust a (rotational) speed of the air compressor.

In yet a further implementation variant the cooling system can comprise a closed cooling circuit configured to conduct the cooling medium through the fuel cell system, wherein the cooling medium is configured to transport heat from the fuel cell system to the second heat exchanger and/or the third heat exchanger. For instance, the cold or cooled fuel at the second/third heat exchanger can be used as a heat sink for the closed cooling circuit. For instance, the closed cooling circuit may be operated with a two-phase cooling medium (coolant), such as carbon dioxide ($CO_2$). In this case, the second/third heat exchanger(s) can each operate as a condenser liquefying the two-phase cooling medium. The portion of the closed cooling circuit running through the fuel cell system (particularly the anode section and cathode section thereof) can operate as an evaporator converting the liquefied cooling medium into the gaseous state. For instance, the fuel cell system may comprise heat exchanging components, so that heat can be transferred from the fuel cell system into the cooling medium. An optional conveying device can circulate the evaporated cooling medium to the second/third heat exchangers to close the circuit.

In accordance with another aspect to better understand the present invention, a vehicle can comprise at least one cooling circuit according to the first aspect, and at least one ram air channel. The ram air channel can be used as a source of cold air, i.e., a heat sink. For instance, at least one of the first heat exchanger, the fourth heat exchanger and the fifth heat exchanger of the at least one cooling circuit can be arranged in the at least one ram air channel and can be configured to use ram air in the at least one ram air channel as a heat sink.

Additionally or alternatively, a motor of the at least one cooling circuit maybe a motor of the vehicle, i.e. a motor that drives/moves the vehicle. For instance, the motor can be an electrical motor that receives electrical energy from the cell system of the at least one cooling circuit.

The vehicle can be an aircraft, a train, a ship, a bus, a car, a truck, etc.

The present disclosure is not restricted to the aspects and variants in the described form and order. Specifically, the description of aspects and implementation variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the invention are now explained in greater detail with reference to the enclosed schematic drawings, in which FIG. 1 schematically illustrates a cooling circuit for circulating fuel.

DETAILED DESCRIPTION OF THE PREFERRED EMBODIMENTS

Figure 1:
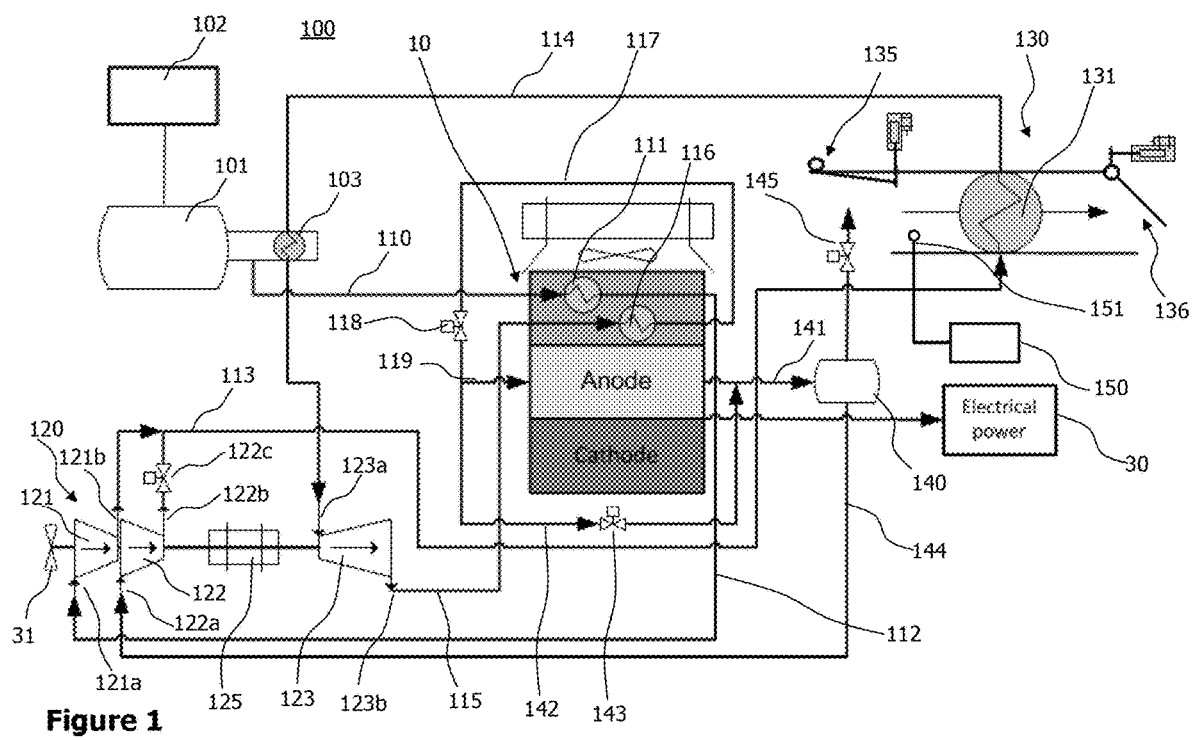

FIG. 1 schematically illustrates a cooling circuit 100 for circulating fuel that can be stored in a fuel tank 101. The fuel may be used in a fuel cell system 10 to be converted into electrical energy. In order to supply fuel in the cooling circuit 100, the fuel tank 101 may be replaced with a full tank and/or may be equipped with a filling tube or nozzle 102, in order to refill fuel tank 101. The fuel in the fuel tank 101 can be at a low temperature, such as −250° C., and/or at a high pressure, i.e., up to 700 bar.

The illustrated cooling circuit 100 comprises a fuel compressor 120 configured to increase a pressure of the fuel. Specifically, if the fuel is stored in fuel tank 101 at a rather low pressure (e.g., between 1 bar and 10 bar), but at a very low temperature, the fuel may be pressurized to a higher pressure in the cooling circuit 100. The temperature increase accompanying the pressurizing of the fuel in fuel compressor 120 can be compensated by directing the compressed fuel through a first heat exchanger 131 cooling the pressurized fuel.

The first heat exchanger 131 may be arranged in a first ram air channel 130, so that ambient air (ram air) is used as a heat sink for the first heat exchanger 131. The first ram air channel 130 may have at least one control device 135, 136 configured to adjust the volume flow of air through the first ram air channel 130. The at least one control device can include an inlet flap 135, which can be operated by an actuator, in order to adjust a cross-section of the inlet flap 135, i.e., allowing adjustment of ram air entering the first ram air channel 130. Likewise, an outlet flap 136 with associated actuator can be employed to control a cross-section of the first ram air channel 130 at the outlet flap 136. Thus, the cooling capacity of the first ram air channel 130 and, hence, the cooling capacity of the first heat exchanger 131 can be controlled.

Additionally or alternatively, a conveying device (not illustrated) may be provided in the first ram air channel 130, in order to convey the air through the first ram air channel 130. By controlling the amount of air conveyed by the conveying device, the cooling capacity of the first heat exchanger 131 can also be controlled. Such conveying device may be used in case the speed (and hence the amount) of the ram air is below a certain threshold, which does not allow the ram air to be sufficient heat sink. In case of an aircraft, for example, the conveying device may be used during ground operation of the aircraft.

The pressurized fuel, which has been cooled in the first heat exchanger 131, can be directed to a first turbine 123 via a first conduit 114 fluidly connecting an outlet of the first heat exchanger 131 with an inlet 123a of the first turbine 123. The first turbine 123 is configured to expand the pressurized and cooled fuel, so that the fuel temperature further decreases due to the expansion. The further cooled fuel can then be directed via a second conduit 115 coupled to an outlet 123b of the first turbine 123 towards the fuel cell system 10. For instance, the fuel can be directed to an anode section 11 (FIG. 3) of the fuel cell system 10, where the fuel is used to be chemically converted into electrical energy.

The fuel in the cooling circuit 100 can be used to cool certain heat generating components. FIG. 1 illustrates the fuel cell system 10 as an exemplary heat generating component. For example, a second heat exchanger 116 can be coupled to the second conduit 115. The second heat exchanger 116 thermally couples the fuel in the second conduit 115 with a cooling medium. The second heat exchanger 116, hence, draws heat from the cooling medium and transfers it to the fuel in the second conduit 115. The cooling medium can be air conveyed by a conveying device 22 (FIG. 3), such as a fan or blower, and flowing over the fuel cell system 10. Additionally or alternatively, the cooling medium can be a cooling medium of a separate (closed) cooling circuit.

The warmed fuel exiting the second heat exchanger 116 may be directed via a further conduit 117 towards the fuel cell system 10. The further conduit 117 may connect an outlet of the second heat exchanger 116 and an inlet 119 of the anode section 11 of the fuel cell system 10. Warming the fuel before entering the fuel cell system 10, increases the efficiency of the fuel cell system 10, as the fuel cell system 10 has a particular operating temperature, for example, around 90° C.

A pressure regulation valve 118 may be arranged in further conduit 117 and/or at inlet 119 of the fuel cell system 10. Thus, pressure regulation valve 118 may control the pressure in the conduits of the cooling circuit 100 upstream of the pressure regulation valve 118, particularly in the conduits 113, 114, 115 downstream of the fuel compressor 120. Furthermore, pressure regulation valve 118 may also control the pressure of the fuel entering the anode section 11 of the fuel cell system 10.

The cooling circuit 100 may further comprise a third conduit 110, 112 connecting the fuel tank 101 with the fuel compressor 120. A third heat exchanger 111 can be arranged in the third conduit 110, 112, which is configured to cool a cooling medium by transferring heat from the cooling medium to the fuel in the third conduit 110, 112. The cooling medium thermally coupled with the fuel, and hence cooled, at the third heat exchanger 111 can be the same as the cooling medium thermally coupled with the fuel at the second heat exchanger 116. Alternatively, a different cooling medium is cooled at the third heat exchanger 111. The third heat exchanger 111 is particularly efficient, if the fuel in fuel tank 101 is stored at a very low temperature, such as approximately −250° C. Since the fuel has to be warmed to be used in the fuel cell system 10 anyway, the thermal energy can be used to cool a heat generating device.

In case it is necessary to warm the fuel in the fuel tank 101 or at an outlet of the fuel tank 101, a further heat exchanger 103 can be implemented in the first conduit 114 connecting the first heat exchanger 131 with the inlet 123a of the turbine 123. Since the fuel in the first conduit 114 has already been compressed and, hence, heated, it will have a higher temperature as the fuel in the fuel tank 101. Thus, thermal energy can be transferred from the fuel in the first conduit 114 into the fuel exiting the fuel tank 101 facilitating the use of the fuel with a fuel cell system 10.

The fuel compressor 120 can include a first compression stage 121 and a second compression stage 122. An inlet 121*a* of the first compression stage 121 is connected to the third conduit 112 connecting the third heat exchanger 111 with the fuel compressor 120. An outlet 121*b* of the first compression stage 121 is connected to a fourth conduit 113 connecting the fuel compressor 120 with the first heat exchanger 131. An inlet 122*a* of the second compression stage 122 can be connected to a recirculation fuel conduit 144 drawing unconsumed fuel from an outlet 141 of the fuel cell system 10. An outlet 122*b* of the second compression stage 122 is also connected to the fourth conduit 113 connecting the fuel compressor 120 with the first heat exchanger 131. A pressure valve 122*c* may regulate an output pressure at the outlet 122*b* of the second compression stage 122, in order to correspond to the pressure in the conduit 113 generated by the first compression stage 121.

The recirculation fuel conduit 144 may alternatively be connected to a reservoir tank 140, which is fluidly coupled with the outlet 141 of the fuel cell system 10. The reservoir tank 140 may buffer unconsumed fuel before it is drawn by the second compression stage 122. The outlet 141, the reservoir tank 140 and/or the recirculation fuel conduit 144 may be connected to a release valve 145, which allows releasing fuel from the cooling circuit 100 into the environment, such as ambient air. FIG. 1 illustrates release valve 145 as exiting in the first ram air channel 130. Depending on the usual temperature of the fuel exiting the release valve 145, the release valve 145 may be arranged upstream or downstream of the first heat exchanger 131, in order to facilitate cooling of the fuel in the first heat exchanger 131. For instance, if fuel is released shortly after exiting the fuel cell system 10, it may have a temperature around the operating temperature of the fuel cell system 10, e.g., approximately 90° C. Thus, the release valve 145 shall be arranged downstream of the first heat exchanger viewed in a flow direction of the ram air through the first ram air channel 130.

In case fuel is required for cooling, particularly at the second heat exchanger 116 and/or the third heat exchanger 111, but is not required at the fuel cell system 10, for example due to a small amount of electrical energy currently required, the cooling circuit 100 can be operated, while bypassing the fuel cell system 10. To do so, the cooling circuit 100 comprises a bypass conduit 142 with a bypass valve 143. The bypass conduit 142 connects the pressure regulation valve 118, conduit 117 or inlet 119 with the outlet 141 of the fuel cell system 10 and/or the reservoir tank 140. Thus, the cooling circuit 100 can be operated to cool the fuel, while bypassing the fuel cell system 10. For instance, the bypassed fuel can be released into the environment via release valve 145.

The cooling circuit 100 may further comprise a control unit 150 configured to control a cooling capacity of the first heat exchanger 131, and further configured to control the fuel compressor 120. The cooling capacity of the first heat exchanger 131 may be controlled via inlet flap 135 and/or outlet flap 136 of the first ram air channel 130. Specifically, depending on the amount of ram air flowing through the first ram air channel 130, the amount of heat that can be transferred from the fuel in the first heat exchanger 131 to the ram air per unit time can be controlled and, hence, the cooling capacity of the first heat exchanger 131 is controllable. The control unit 150 can control the fuel compressor 120 and/or the at least one control device 135, 136 in such a manner that the cooling capacity of the first heat exchanger 131 is kept to a minimum. This means that the volume flow of air through the first ram air channel 130 is kept to a minimum. Thus, the amount of required ram air is reduced, which leads to less drag and, hence, less energy consumption to move, for example, a vehicle including the cooling circuit 100.

Likewise, the control unit 150 can control the fuel compressor 120, for example a compression ratio of the fuel compressor 120 and, hence, an increase in temperature of the fuel exiting the fuel compressor 120. As long as there is a temperature difference between the fuel temperature at the outlet 121*b* of the fuel compressor 120 and the ram air in the first ram air channel 130, the compressed fuel can be cooled in the first heat exchanger 131 and can be further cooled when expanded in the turbine 123. In order to determine the temperature of the ram air, the control unit may be connected to at least one temperature sensor 151 arranged in the ram air channel A further temperature sensor (not illustrated) can be arranged in the cooling circuit 100, for example at the outlet 121*b* of the fuel compressor 120.

The fuel compressor 120 may be driven by a motor 125. The motor 125 (particularly its driving power and/or rotational output speed) may be controlled by the control unit 150, in order to control the compression ratio of the fuel compressor 120. In case the control unit 100 is employed in a vehicle 2 (FIG. 5), the motor 125 can be a motor that drives the vehicle 2. The motor 125 can be an electrical motor 125, which, for example, receives electrical energy 30 produced by the fuel cell system 10.

FIG. 1 illustrates a propeller 31 that is mechanically coupled to the motor 125, for example via a common shaft. Thus, propeller 31 may drive a vehicle in form of an aircraft. Of course, propeller 31 is only exemplary, while any other drivetrain, wheel or the like can be driven by motor 125.

Figure 2:
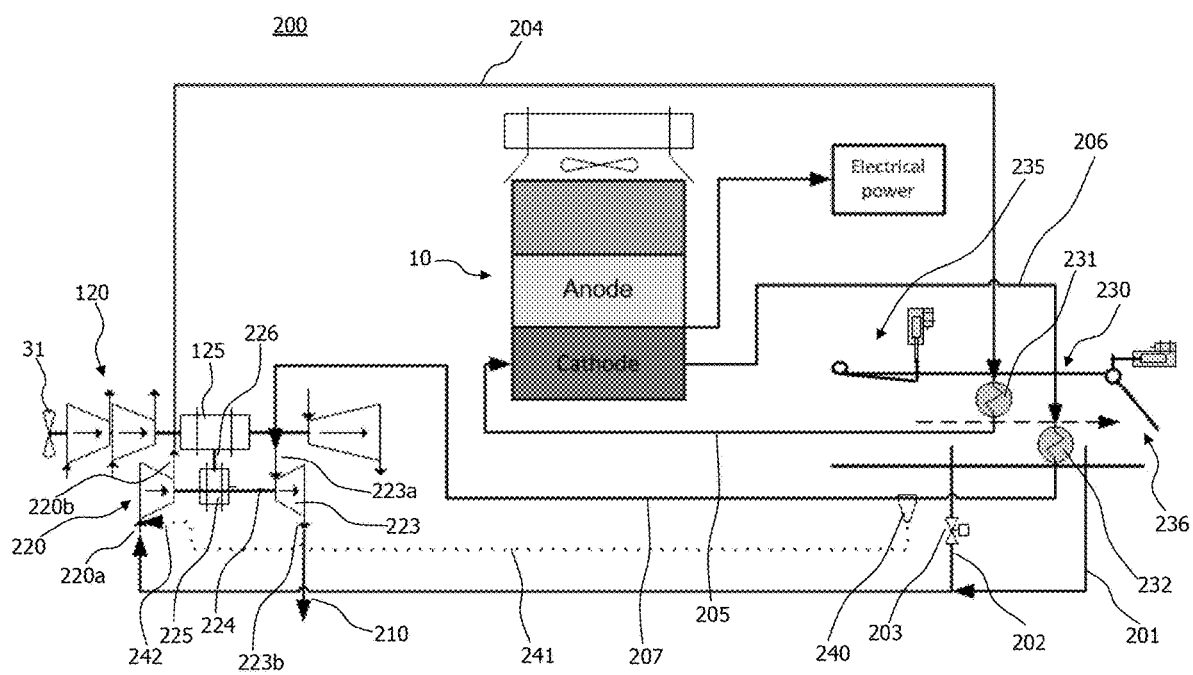
FIG. 2 schematically illustrates a cooling circuit for circulating air.
Figure 3:
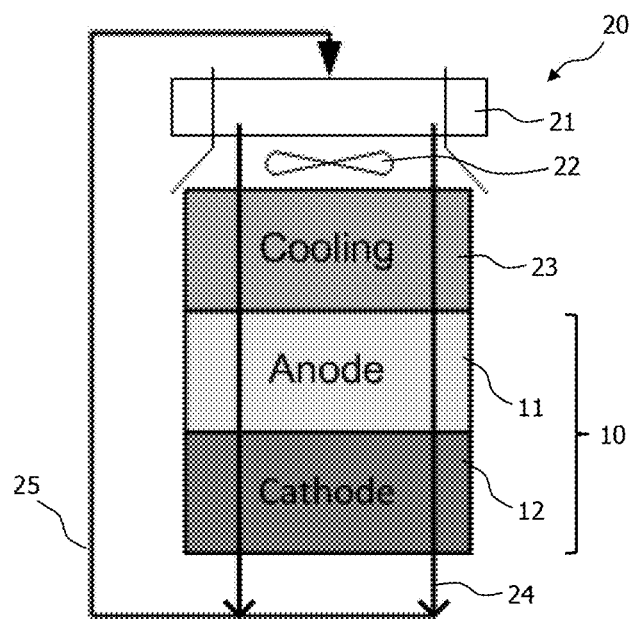
FIG. 3 schematically illustrates a closed cooling circuit of a fuel cell system.

FIG. 2 schematically illustrates a cooling circuit 200 for circulating air. The fuel cell system 10 requires an oxidant, such as air, which can be provided by the cooling circuit 200. Cooling circuit 200 may form part of cooling circuit 100 or may be separately arranged. Fresh air can be drawn via a fresh air conduit 201, 202 that is coupled/connected to an inlet 220*a* of an air compressor 220, which compresses the fresh air and releases the compressed air at outlet 220*b*. The compressed air is then directed via a compressed air conduit 204, 205 from the outlet 220*b* of the air compressor 220 to the fuel cell system 10, particularly to cathode section 12 (FIG. 3).

A fourth heat exchanger 231 can be arranged in the compressed air conduit 204, 205, in order to cool the compressed air. The fourth heat exchanger 231, for example, can be arranged in the first ram air channel 130 or in a second, separate ram air channel 230. By controlling the volume flow of ram air through the second ram air channel 230 via associated inlet flap 235 and/or outlet flap 236, the temperature of the cold compressed air in compressed air conduit 205 can be controlled and optimized for the operation of the fuel cell system 10.

The cooling circuit 100, 200 may further comprise an exhaust air conduit 206, 207 coupled to an outlet of the fuel cell system 10, particularly the outlet of the cathode section 12. Since the fuel cell system usually operates at a particular temperature, such as approximately 90° C., the thermal energy of the exhaust air in conduit 206 can be recovered and used for other purposes. For instance, a fifth heat exchanger 232 can be arranged in the exhaust air conduit 206, 207, which is configured to cool the exhaust air. For instance, the fifth heat exchanger 232 is also positioned in the second ram air channel 230, in order to use ram air as a heat sink.

The thermal energy transferred from the exhaust air to the ram air can be used to provide the cooling circuit 200 with warm fresh air. As illustrated in FIG. 2, the fresh air conduit delivering fresh air to the inlet 220a of the air compressor 220 may include a first branch 201, which opens into the ram air channel downstream of the fifth heat exchanger 232 viewed in a ram air flow direction. Thus, the ram air heated by thermal energy transfer at the fifth heat exchanger 232 can be sucked in via the first branch 201 of the fresh air circuit.

In order to adjust the temperature of the fresh air, a second branch 202 of the fresh air conduit may be provided, which opens into the second ram air channel 230 or any other location, from which fresh air can be sucked in at a temperature lower than the temperature of air downstream of the fifth heat exchanger 232. Via a temperature control valve 203 configured to adjust a cross-section of the second branch 202 and, hence, to adjust the volume flow of fresh air through the second branch 202, the fresh air temperature at the inlet 220a of the air compressor 220 can be set to a predetermined value. The temperature control valve 203 can be controlled via control unit 150 or can be self-controlled, for example, via a bimetal or similar device (not illustrated) extending with decreasing mixed air temperature.

Due to the cooling of the exhaust air in the fifth heat exchanger 232, water contained in the exhaust air can be condensed and separated in water separator 240. The collected water can be directed via water conduit 241 towards the fuel cell system 10, which requires a minimum humidity in order to operate properly. An easy manner to add water to the fresh air is to spray the water into the fresh air conduit 201, 202, for example, upstream of the inlet 220a of the air compressor 220 with a corresponding spray nozzle 242. Here the pressure of the fresh air is approximately an atmospheric pressure, and the water in the water conduit 241 has also approximately atmospheric pressure or slightly above. In order to avoid freezing of the water, the temperature of the air in the fresh air conduit 201, 202 maybe controlled to be above 0° C.

Since the exhaust air is usually slightly pressurized, as the fuel cell system 10 operates at a small pressure, such as approximately 2 bar, further energy can be drawn from the exhaust air. For instance, the cooling circuit 200 may further comprise a second turbine 223. An inlet 223a of the second turbine 223 may be coupled to the exhaust air conduit 207, in order to expand exhaust air downstream of the fifth heat exchanger 223. An outlet 223b of the second turbine 223 can be fluidly coupled with ambient air outside of the cooling circuit 100, 200, such as the environment. Due to the pressure difference between the exhaust air and the ambient air, the turbine 223 can be operated. The thus obtained mechanical energy can be used to drive the fresh air compressor 220, for example, via a common shaft. Additionally or alternatively, the air compressor 220 can be operated via its own motor (not illustrated), and/or via a gearbox 225 mechanical a couple to an auxiliary drive 226 of the motor 125 of the fuel control circuit 100.

FIG. 3 schematically illustrates a closed cooling circuit 20 of a fuel cell system 10. Particularly the closed cooling circuit 20 is configured to cool the fuel cell system 10. For instance, a cooling circuit or conduits 24, 25 are configured to conduct a cooling medium through the fuel cell system 10, particularly the anode section 11 and cathode section 12. The cooling medium is configured to transport heat from the fuel cell system 10 to a cooling section 23 of the closed cooling circuit 20.

The second heat exchanger 116 and/or the third heat exchanger 111 of the cooling circuit 100 can be arranged in the cooling section 23. The second and/or third heat exchanger 116, 111 can cool the cooling medium, for example, act as a condenser for the cooling medium cycling through the closed cooling circuit 20. Likewise, the cooling medium can be heated up, for example, evaporated, when flowing through the fuel cell system 10.

The cooling medium can cycle through the closed cooling circuit 20 due to the evaporation and, hence, the expansion of the cooling medium. In addition or alternatively, a conveying device 21 can be employed to convey the cooling medium through the closed cooling circuit 20.

Figure 4:
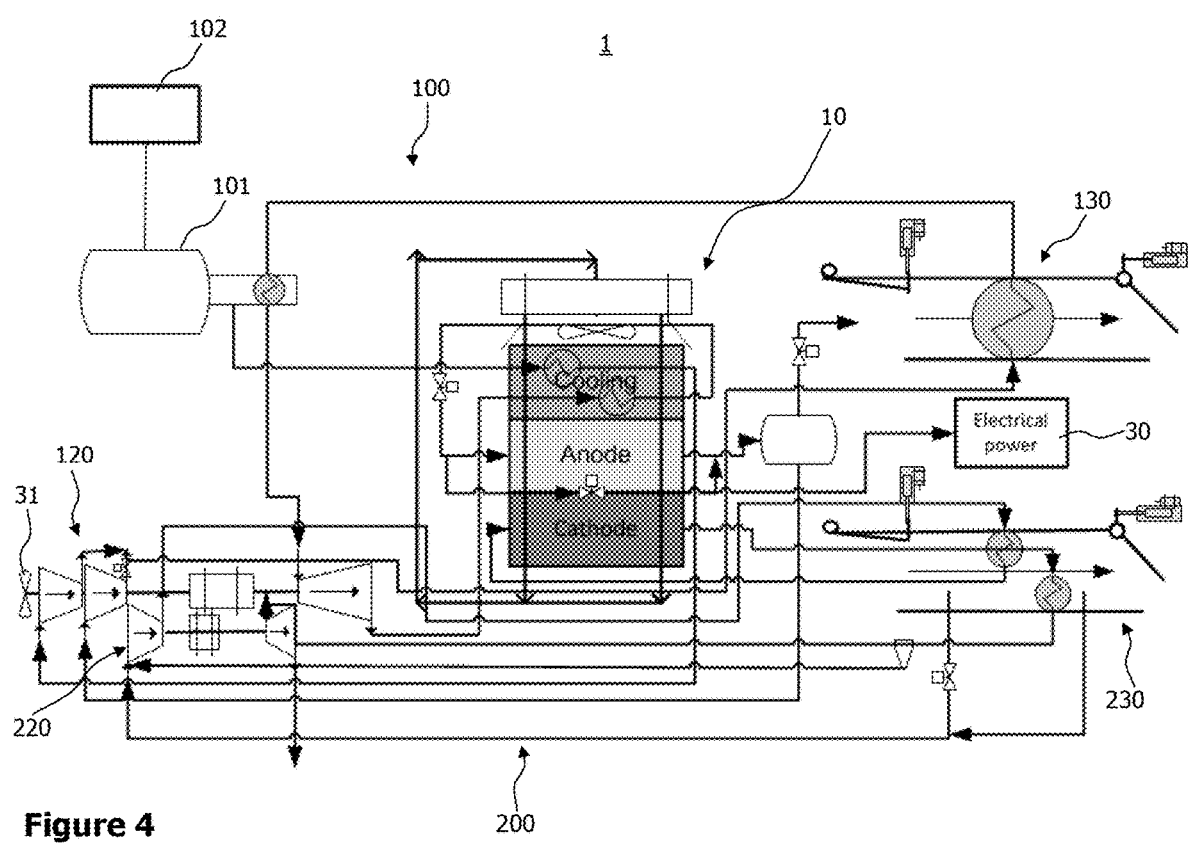
FIG. 4 schematically illustrates a cooling system for a fuel cell system.

FIG. 4 schematically illustrates a complete cooling system 1 for a fuel cell system 10. The cooling system 1 can comprise a cooling circuit 100 operable with fuel as illustrated in and described with respect to FIG. 1 and an air cooling circuit 200 as illustrated in and described with respect to FIG. 2.

Figure 5:
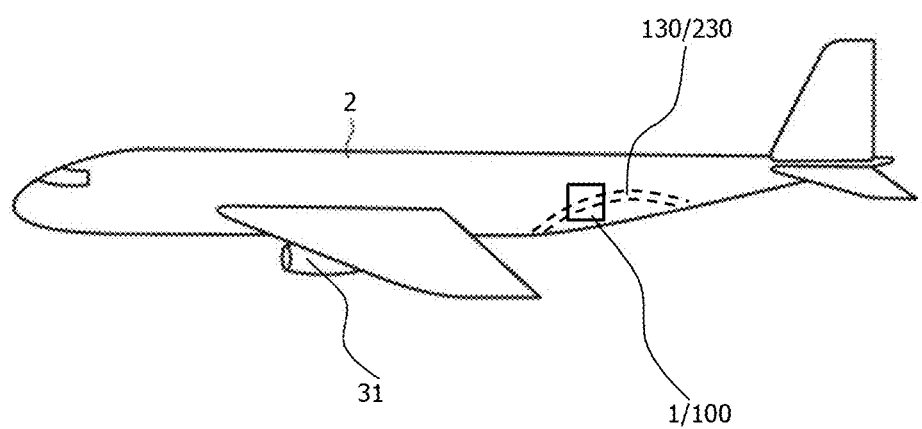
FIG. 5 schematically illustrates a vehicle.

FIG. 5 schematically illustrates a vehicle 2 comprising at least one cooling circuit 100, 200 and/or at least one cooling system 1. The vehicle 2 can further comprise at least one ram air channel 130, 230, wherein at least one of the first heat exchanger 131, the fourth heat exchanger 231 and the fifth heat exchanger 232 can be arranged in the at least one ram air channel 130, 230. The ram air in the at least one ram air channel 130, 230 is used as a heat sink for each of these heat exchangers 131, 231, 232.

Furthermore, a motor 125 of the at least one cooling circuit 100 main drive an engine 31, propeller, other drivetrain or the like of the vehicle 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling circuit operable with fuel of a fuel cell system, comprising:
   a fuel tank storing fuel for the fuel cell system;
   a fuel compressor configured to increase a pressure of the fuel;
   a first heat exchanger configured to cool the pressurized fuel;
   a first conduit coupled to an outlet of the first heat exchanger;
   a first turbine coupled to the first conduit and configured to expand the pressurized and cooled fuel;
   a second conduit coupled to an outlet of the first turbine and configured to direct the expanded fuel to the fuel cell system; and, a third conduit connecting the fuel tank with the fuel compressor;

wherein the fuel compressor includes a first compression stage and a second compression stage;

wherein an outlet of the first compression stage, or an outlet of the second compression stage, or both the outlet of the first compression stage and the outlet of the second compression stage are coupled to a fourth conduit configured to direct compressed fuel to the first heat exchanger.

2. The cooling circuit according to claim 1, further comprising:

a control unit configured to control a cooling capacity of the first heat exchanger, and further configured to control the fuel compressor such that the first heat exchanger can be operated with a minimal cooling capacity.

3. The cooling circuit according to claim 2, further comprising:

a first ram air channel; and at least one control device configured to adjust a volume flow of air through the first ram air channel, wherein the first heat exchanger is arranged in the first ram air channel, and wherein the control unit is configured to operate the fuel compressor and adjust the at least one control device such that the volume flow of air through the first ram air channel is kept to a minimum.

4. The cooling circuit according to claim 1, further comprising a second heat exchanger arranged in the second conduit and configured to transfer heat from a cooling medium to the fuel in the second conduit.

5. The cooling circuit according to claim 1, further comprising:

a third heat exchanger arranged in the third conduit and configured to transfer heat from a cooling medium to the fuel in the third conduit.

6. The cooling circuit according to claim 1, further comprising:

wherein an inlet of the first compression stage is coupled to the third conduit, and wherein an inlet of the second compression stage is coupled to a recirculation fuel conduit drawing unconsumed fuel from an outlet of the fuel cell system.

7. The cooling circuit according to claim 1, further comprising a motor coupled to the fuel compressor and configured to control the pressure of the fuel at an outlet of the fuel compressor.

8. The cooling circuit according to claim 1, further comprising:

an air compressor configured to compress air; and a compressed air conduit coupled to an outlet of the air compressor and configured to direct the compressed air to the fuel cell system.

9. The cooling circuit according to claim 8, further comprising a fourth heat exchanger arranged in the compressed air conduit and configured to cool the compressed air.

10. The cooling circuit according to claim 8, further comprising:

an exhaust air conduit coupled to an outlet of the fuel cell system;

a fifth heat exchanger arranged in the exhaust air conduit and configured to cool exhaust air; and a water separator arranged in the exhaust air conduit downstream of the fifth heat exchanger and configured to remove water from the cooled exhaust air.

11. The cooling circuit according to claim 10, further comprising:

a fresh air conduit coupled to an inlet of the air compressor, wherein at least one of a first branch of the fresh air conduit collects fresh air heated by the fifth heat exchanger, and a second branch of the fresh air conduit collects fresh air not heated by the fifth heat exchanger, or the water from the water separator is sprayed into the fresh air conduit upstream of the inlet of the air compressor.

12. The cooling circuit according to claim 10, further comprising:

a second turbine coupled to the exhaust air conduit and configured to expand exhaust air in the exhaust air conduit downstream of the fifth heat exchanger, wherein the second turbine is mechanically coupled to the air compressor to drive the air compressor, wherein an outlet of the second turbine is fluidly coupled with ambient air outside of the cooling circuit.

13. The cooling circuit according to claim 8, further comprising:

a motor coupled to the fuel compressor and configured to control the pressure of the fuel at an outlet of the fuel compressor;

an auxiliary drive of the motor; and a gearbox mechanically coupled to the auxiliary drive and configured to drive the air compressor.

14. The cooling circuit according to claim 4, further comprising:

a third conduit connecting the fuel tank with the fuel compressor; and a third heat exchanger arranged in the third conduit and configured to transfer heat from a cooling medium to the fuel in the third conduit, wherein the cooling circuit comprises a closed cooling circuit configured to conduct the cooling medium through the fuel cell system, wherein the cooling medium is configured to transport heat from the fuel cell system to at least one of the second heat exchanger and the third heat exchanger.

15. A vehicle comprising:

at least one cooling circuit according to claim 9;

at least one ram air channel, an exhaust air conduit coupled to an outlet of the fuel cell system;

a fifth heat exchanger arranged in the exhaust air conduit and configured to cool exhaust air; and a water separator arranged in the exhaust air conduit downstream of the fifth heat exchanger and configured to remove water from the cooled exhaust air wherein at least one of the first heat exchanger, the fourth heat exchanger and the fifth heat exchanger is arranged in the at least one ram air channel and configured to use ram air in the at least one ram air channel as a heat sink.

16. A cooling circuit operable with fuel of a fuel cell system, comprising:

a fuel tank storing fuel for the fuel cell system;

a fuel compressor configured to increase a pressure of the fuel;

a first heat exchanger configured to cool the pressurized fuel;

a first conduit coupled to an outlet of the first heat exchanger;

a first turbine coupled to the first conduit and configured to expand the pressurized and cooled fuel;

a second conduit coupled to an outlet of the first turbine and configured to direct the expanded fuel to the fuel cell system;

a second heat exchanger arranged in the second conduit and configured to transfer heat from a cooling medium to the fuel in the second conduit;

a third conduit connecting the fuel tank with the fuel compressor; and a third heat exchanger arranged in the third conduit and configured to transfer heat from a cooling medium to the fuel in the third conduit, wherein the cooling circuit comprises a closed cooling circuit configured to conduct the cooling medium through the fuel cell system, wherein the cooling medium is configured to transport heat from the fuel cell system to at least one of the second heat exchanger and the third heat exchanger.

\* \* \* \* \*